April 30, 1957 R. E. RISLEY ET AL 2,790,652
INSULATED SADDLE TYPE PIPE FITTING
Filed July 3, 1951 3 Sheets-Sheet 1
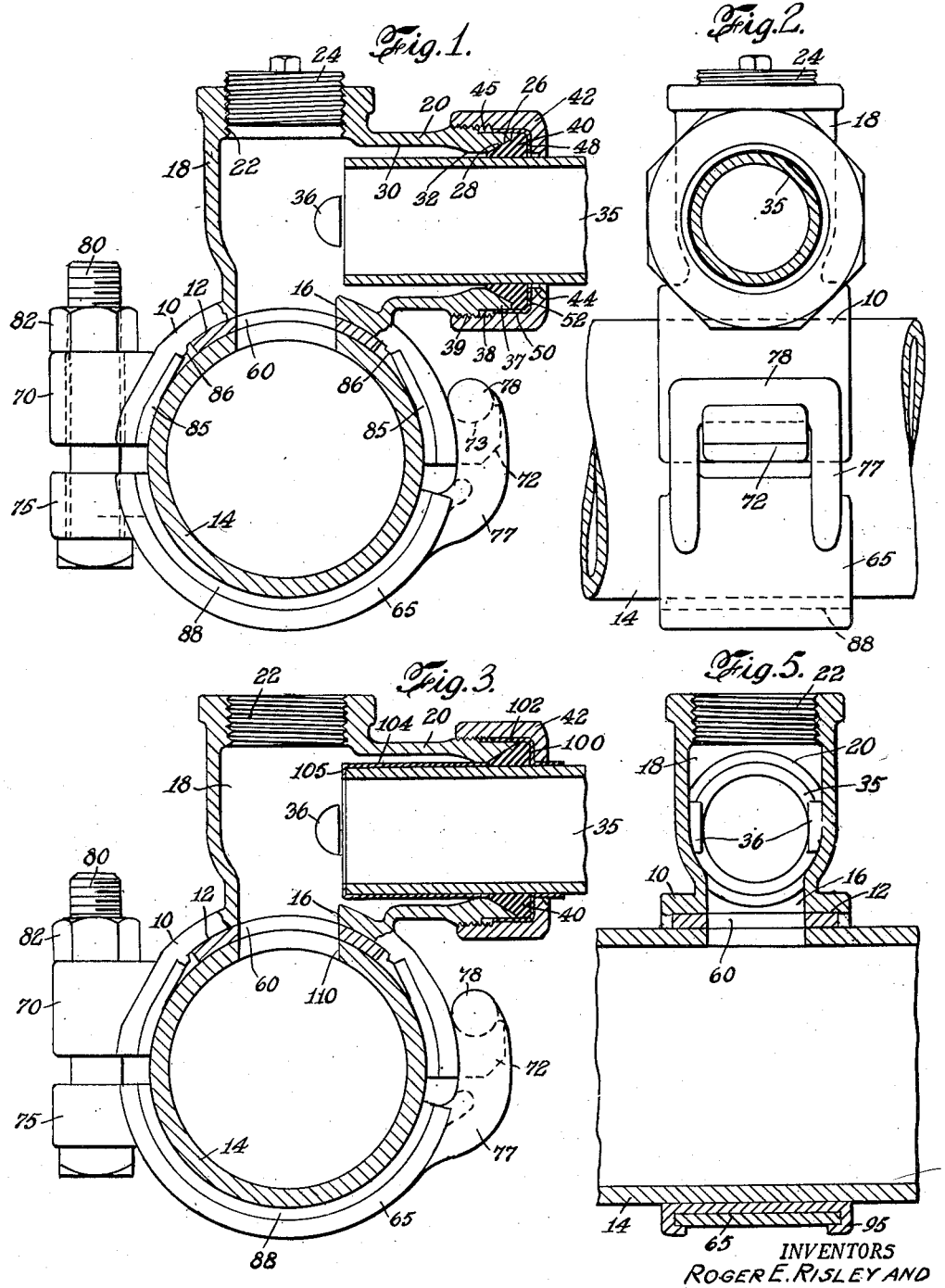
INVENTORS
ROGER E. RISLEY AND
BY ROBERT N. PATERSON
ATTORNEY April 30, 1957 R. E. RISLEY ET AL 2,790,652
INSULATED SADDLE TYPE PIPE FITTING
Filed July 3, 1951 3 Sheets-Sheet 2
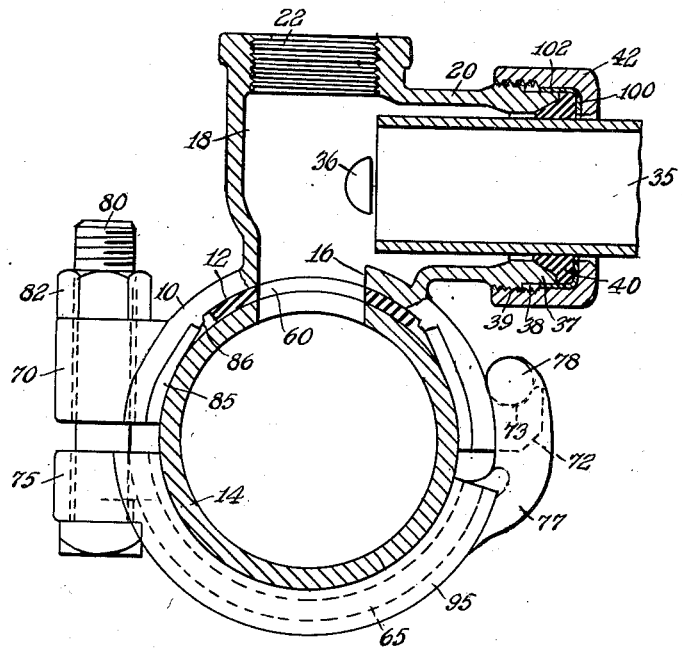
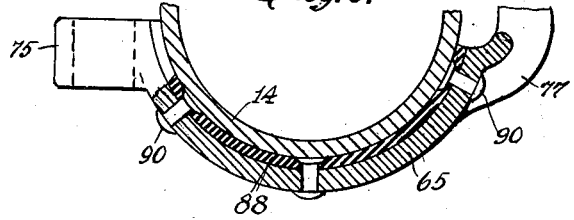
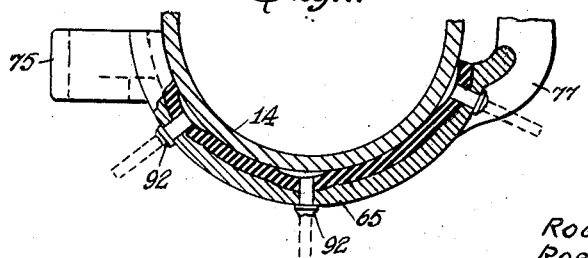
INVENTORS
ROGER E. RISLEY AND
ROBERT N. PATERSON
BY Robert E. Burns
ATTORNEY

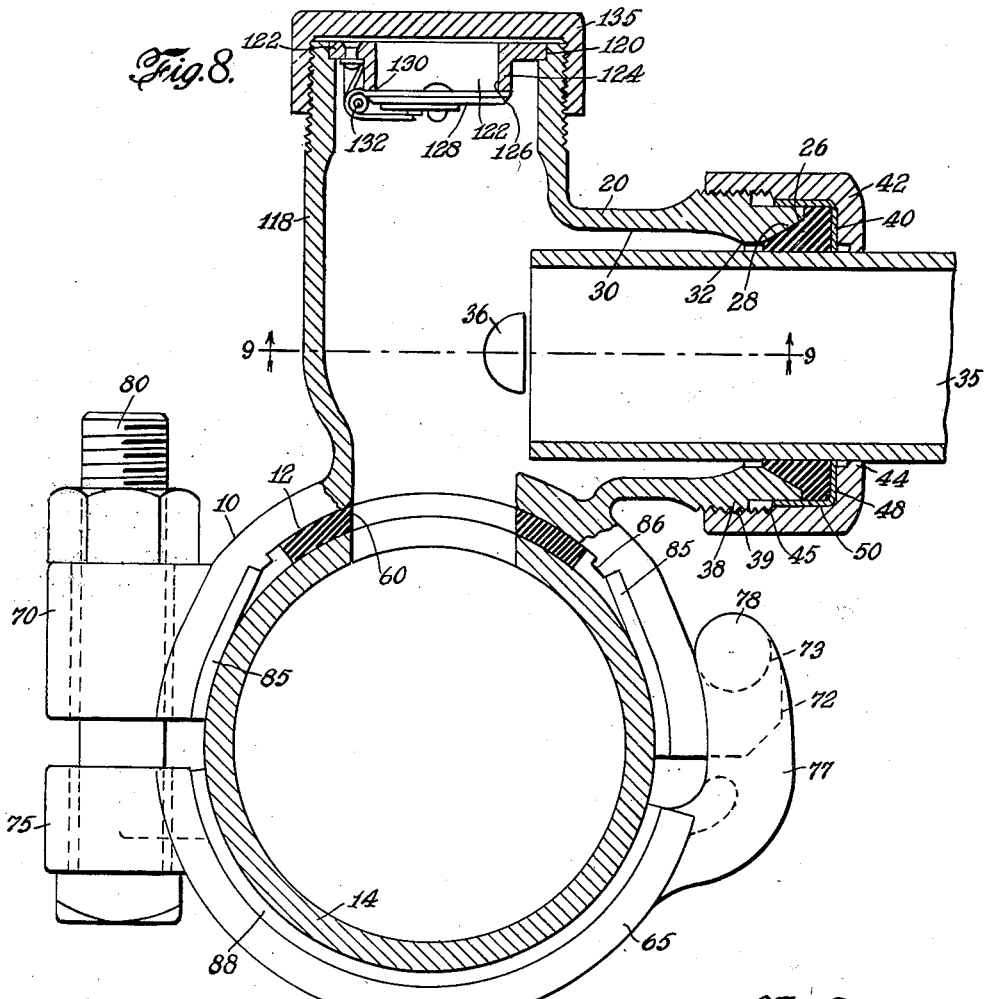

United States Patent Office 2,790,652
Patented Apr. 30, 1957

2,790,652

INSULATED SADDLE TYPE PIPE FITTING

Roger E. Risley and Howard L. Hoke, Bradford, Pa., assignors to Dresser Industries, Inc., a corporation of Delaware Application July 3, 1951, Serial No. 235,064

5 Claims. (Cl. 285—47)

This invention relates to pipe fittings and is more particularly concerned with a pipe saddle of the type employed for connecting a branch line to a main pipe line, as in the distribution of gas and like fluids.

In the installation and use of pipe lines for the distribution of gas, water, oil and the like, when it is desired to attach a branch pipe line of smaller diameter to a main line, particularly when the differences between the diameters of the branch line and the main line are great, a fitting known as a "saddle" is commonly employed. A saddle may be applied either at the time the main line is being installed or may be used to attach a new branch line to an existing main line and is, therefore, of general utility. Saddles generally comprise a main body portion in the form of a block of metal having a curved inner face adapted to engage the side wall of the main line pipe section. The body portion is provided with a threaded aperture in which the branch line is received, and means are provided for drawing the body portion into fluid-tight engagement with the surface of the main line. Thus, stirrups or bails are commonly employed to surround the main line and to engage portions of the body to draw it against the line. Gaskets formed from lead, rubber, or like materials are used for insuring a fluid-tight seal.

While saddles of various types have been extensively used and are effective for their intended purpose, the relatively rapid corrosion of such saddles in service has presented a serious problem and has represented a significant maintenance expense. Such corrosion attack has been found to be almost entirely of electrical origin and to result from the passage into the branch line of electrical currents flowing along the main line, or vice versa. Since pipe lines with which saddles are commonly used are buried in the ground, they tend to pick up electrical currents which emanate from a variety of sources such as the tracks of electric railway systems, industrial power grounds, induced currents from parallel lines, chemical action of soils of different compositions along the route of the pipe line, galvanic action between different metals, e. g. the metal of the saddle and the metal of the main line pipe, and the like. Such currents are, therefore, an almost ever-present threat to the pipe line and saddles are particular receptive to such corrosion attack for the reason that they present a discontinuity of structural elements composed of projecting members and edges. The electrical currents set up an electrolytic reaction between the metal of the pipe and the soil surrounding it, and when the current is allowed to flow unrestrictedly through the saddle this electrolytic action soon causes serious damage and failure of the saddle. Furthermore, not only the saddles are damaged by such electrolytic action but the adjacent portions of the main line pipe and the branch line pipe are attacked as well. A major practical problem in the use of pipe saddles is, consequently, the adequate protection of these fittings from the destructive action of the electric currents encountered in service. It is of great practical importance to reduce to a minimum the need for repair or replacement of the saddles or other portions of the lines, since such maintenance is expensive and time consuming and necessitates costly interruptions in service.

In pipe lines constructed with flexible compression couplings, e. g. the well-known Dresser coupling, it has been proposed to impede the flow of electrical currents along the lines by the use of so-called insulating couplings. Such insulating couplings, however, do not solve the problem of corrosion attack of saddles and saddles are very commonly used in connection with pipe lines formed from pipe sections joined by conventional non-flexible, non-insulating couplings.

Furthermore, the saddles commonly employed have a threaded opening for the reception of the threaded branch line but are not adapted to be directly connected to an unthreaded branch line. To make this type of connection with an unthreaded line when using a conventional saddle, it is necessary to employ a special additional fitting, e. g. a service T. This arrangement complicates the installation of the branch line and tends to make installation and maintenance costs higher, particularly when the saddle is not protected from attack by electrical currents. It is thus desirable to provide a single integral saddle fitting which includes the features of the service T-saddle combination heretofore used and which can be connected directly to a threaded or unthreaded branch line without requiring the use of additional fittings of any kind.

A particularly serious problem arises when it is desired to install a conventional saddle for connecting a branch line to a main pipe line which is in service. Ordinarily the saddle is applied, then an aperture is drilled in the main line pipe under the saddle, the drill being inserted in the threaded opening in the saddle into which the threaded branch line or the special fitting of the type above mentioned is to be screwed. Finally, the drill is withdrawn and the branch line pipe or fitting screwed into place. Obviously this sequence of steps cannot be carried out simultaneously, with the result that once the aperture in the main line pipe has been drilled the fluid carried by the main line pipe will escape while the branch line pipe of branch fitting is being installed. While in some cases this may not be too serious, when a high-pressure fluid is involved the person making the installation is confronted with a major problem. Not only may a substantial quantity of fluid be lost but the flow through the threaded aperture into which the branch line is to be inserted seriously interferes with attempts to screw the branch line or branch fitting into place. There is thus a need for a saddle which can be installed on a main line while in service and which at the same time avoids the above-mentioned problems.

It is the principal object of this invention to provide an electrically insulating pipe saddle adapted for effecting a fluid-tight, non-conductive connection between a main line pipe and a branch line pipe.

It is another object of the invention to provide a service T-saddle which is adapted to receive either a threaded or unthreaded branch line pipe without requiring the use of special additional fittings.

It is another object of the invention to provide a saddle of simplified construction which effectively prevents the flow of electrical currents between the main line pipe and the branch line pipe to which it is joined.

It is another object of the invention to provide a saddle adapted to receive either a threaded or unthreaded branch line pipe and to be connected directly to a main line pipe while in service without any substantial loss of fluid from the pipes.

It is a further object of the invention to provide a saddle of the character indicated which is constructed in such manner that the connection with the branch line is not obstructed by the fluid flowing from the main line pipe.

According to the invention we provide an insulating pipe saddle comprising a body portion having an arcuate inner face conforming to the curvature of the exterior surface of the main line pipe, a secondary or clamping portion adapted, in conjunction with the body portion, to surround the main line pipe and by engagement with the body portion to draw it against the surface of the pipe, and insulating means adapted to be disposed between the body portion and the main line pipe and between the clamping portion and the main line pipe. The body portion of the saddle in accordance with the invention comprises an upper section substantially in the form of a T, having the branch of the T adapted to receive the threaded or unthreaded branch line. In accordance with a preferred embodiment the upper run of the T-form body section is provided with check valve means for effectively closing the opening through which the drill is adapted to be inserted for forming the aperture in the main line pipe.

Other objects and features of the invention will be apparent from the following detailed description thereof and from the drawings, wherein, Fig. 1 is an end elevation, partly in section, of an insulated service T saddle embodying features of the invention;

Fig. 2 is a side elevation of the saddle shown in Fig. 1;

Fig. 3 is a side elevation, partly in section, of another embodiment of the insulated service T saddle of the invention;

Fig. 4 is a similar view of a further embodiment of the invention;

Fig. 5 is an end elevation of the embodiment shown in Fig. 4;

Fig. 6 is an end elevation of the lower jaw portion of another embodiment;

Fig. 7 is a similar view of another embodiment of the invention;

Fig. 8 is a side elevation partly in section of an embodiment of the invention provided with a check valve in the run of the T;

Fig. 9 is a sectional view taken approximately along the line 9—9 in Fig. 8;

Fig. 9a is a fragmentary sectional view of the saddle shown in Fig. 8 provided with a modified form of check valve; and Fig. 9b is a sectional view taken approximately on the line 9b—9b of Fig. 9a.

Referring to the drawings, and particularly to Figs. 1 and 2, the numeral 10 designates the body portion of an illustrative embodiment of our insulating service T saddle. The body 10, which is suitably formed from steel, cast iron, or other metal, has an inner arcuate face 12 having a curvature conforming substantially to that of the exterior surface of the main line pipe 14 upon which the saddle is installed. The body 10 is formed with a central upwardly-directed aperture 16 which communicates with the interior of a T formed integrally with the body and having a threaded run 18 and a branch 20. The run 18 in the embodiment illustrated is formed with an internal thread 22 and may be closed, as by a plug 24, as shown in Fig. 1. It will be apparent, however, that the run 18 may, if desired, be connected to a threaded branch line pipe (not shown). The branch 20 is constructed in the form of a so-called compression type coupling and is adapted to receive threaded or unthreaded pipe in fluid-tight engagement. Thus, the branch 20 is in the form of a substantially tubular sleeve having its free end flared outwardly to provide a gasket recess 26 which has an inwardly-tapered wall 28 joining the inner tubular wall 30 of the branch 20 at a pipe aperture 32, which is adapted to receive the branch line pipe 35. In the embodiment illustrated, the T portion of the body portion 10 is provided with a stop 36 at the inner end of branch 20, which is shown as an inwardly-projecting stud or knob and is adapted to engage the end of branch line pipe 35 to prevent it from extending across the aperture 16 and thus impeding free flow through the T. The outer surface of branch 20 is formed with a cylindrical portion 37 extending from the outer edge of branch 20 to an annular portion 38 of greater diameter, the outer face of said annular portion being provided with screw threads 39.

Fluid-tight sealing between the branch 20 and the branch-line pipe 35 is effected by means of a compressible gasket 40 which is advantageously formed from rubber or rubber composition, this term being used generically to include natural and synthetic rubber, and other elastomeric compounds or compositions having like properties and characteristics. The material is relatively firm and solid but sufficiently resilient and elastic to flow under pressure to conform to the surfaces between which it is confined. Preferably, the gasket 40 is shaped to fit the gasket recess 26, i. e. it has a substantially wedge-shaped or triangular cross-section, although gaskets of other cross-sectional form may be used.

The gasket 40 is compressed into fluid-tight sealing relationship with the surface of branch line pipe 35 by means of an annular follower nut 42 which threadedly engages the threaded annular portion 38 on branch 20 and is adapted to be tightened on the branch 20. The nut 42 is provided with a pipe aperture 44 of substantially the same diameter as aperture 32 in branch 20 for receiving the branch line pipe, to effect the necessary compression of the gasket 40. As will be apparent from Fig. 1, the follower nut 42 is so formed that its internal cylindrical face is of greater diameter than the cylindrical portion 37 thus forming a thin annular recess 45. A cup-shaped metal follower 48 having an inwardly directed body portion 50 and an axial flange 52 surrounds the outer end of the gasket 40 and fits loosely within follower nut 42 so that in tightening the nut upon the end of branch 20, the follower is held stationary by its frictional engagement with the gasket and the nut turns with respect to the follower with the result that there is no frictional contact between the nut 42 and the gasket 40. The flange 52 of the follower fits over the cylindrical portion 37 and is accommodated within the recess 45. The follower 48 is dimensioned so that substantially complete compression of the gasket 40 can be effected before the leading edge of the flange 52 will engage annular portion 38. The pipe receiving aperture 32 and the aperture 44 of follower nut 42 are, as previously mentioned, of substantially the same diameter and are formed in sizes to fit any of the standard sizes of pipe. It will be apparent, however, that by reason of the gasket 40 which is capable of substantial inward radial movement upon compression, that a given aperture size will accommodate considerable variance in the outside diameter of the pipe and there is no need for the pipe or tubing to be received by the fitting to be of the exact size of apertures 32 and 44. Furthermore, it will be observed that there is no threaded engagement with the branch line. It will be apparent that our fitting will accommodate threaded or unthreaded pipe, tubing and the like and is thus of universal application.

Fluid-tight non-conducting sealing engagement between the main line pipe 14 and the aperture 16 in the arcuate face 12 of the saddle body portion is effected by means of a sheet 60 formed from a resilient, insulating material such as rubber or rubber composition of the type described above in connection with gasket 40. Preferably, the sheet 60 is formed from a rubbery composition which is relatively resistant to attack by hydrocarbon gases and oils. Examples of such resistant rubber compositions suitable for use with our saddle are neoprene (polychloroprene) and butadiene-acrylonitrile copolymers, such as those known commercially by the trade designations Buna-N or GR-A. Our invention is not limited to these specific materials, however, and particularly when special resistance to gases and oils is not required, any rubbery composition having the above-described characteristics may be employed.

The body portion 10 of our saddle is applied to the main line pipe by cooperative engagement with a clamping member 65 of complementary construction, the body portion and the clamping portion being drawn together into clamping frictional engagement with the main line pipe 14. The clamping member 65 comprises an arcuate main portion having a curvature substantially equal to that of the exterior surface of the main line pipe 14. The face 12 of the body portion 10 and the arcuate portion of clamping member 65 are suitably dimensioned to fit any of the sizes of pipe produced commercially and used for the construction of gas lines and the like. It is known that in practice pipes vary to some extent from what may be termed the "nominal" external diameter, some being of slightly greater diameter and others being of somewhat lesser diameter, i. e. varying from what may be termed a "maximum" pipe to what may be termed "minimum" pipe. The insulating pipe saddle of our invention is of a construction which adapts it to be used with equal effectiveness both with maximum pipe and with minimum pipe, as will be apparent as the description proceeds.

The clamping member 65 is constructed to be hingedly engaged with the body portion 10 and the two portions of the saddle are adapted to be drawn together into clamping engagement around the main line pipe. Thus, the body portion 10 is formed along one longitudinal edge with an apertured flange or bar 70 and is provided on its other longitudinal edge with a centrally-positioned supporting projection 72 having an arcuate upper face 73 and forming part of the hinged connection between the saddle portions. The clamping member 65 is similarly provided along one longitudinal edge with an apertured flange or bar 75 complementary to the flange 70 and the opposite longitudinal edge of the clamping member is provided with a U-shaped stirrup member 77 having a cross-bar 78 adapted to be received in the arcuate face 73 of the projection 72, as clearly shown in Fig. 1. The two portions of the saddle are drawn together by bolts 80 which pass through the apertures in flanges 70 and 75 and are engaged by nuts 82.

It is a feature of our invention that the saddle is electrically insulated from the main line pipe in such a way that flow of electrical current through the saddle between the main pipe and the branch pipe is prevented. For this purpose we provide, in addition to the insulating fluid-sealing sheet or gasket 60 which insures a fluid-tight connection between the body portion 10 and the main line pipe 14 after the aperture has been drilled in the pipe, insulating sheets disposed between the body portion 10 and the pipe 14 and between the clamping member 65 and the pipe 14. Referring to Fig. 1 the arcuate face 12 of body portion 10 is provided with two sheets or strips 85 of insulating material, secured to the body portion in any convenient manner, as by means of an adhesive. In the embodiment shown in Fig. 1 the arcuate face 12 is formed with two longitudinal ribs 86 which serve to position the gasket sheet 60 and the insulating strips 85. These ribs may, however, be eliminated, if desired. The clamping member 65 is similarly provided with an insulating sheet or strip 88 disposed on the arcuate inner face of the member 65.

The strips 85 and 88 may be formed from any relatively flexible, somewhat compressible material such as the above-described rubber material from which the sheet 60 and the gasket 40 are advantageously formed. We have found particularly suitable a pliable pressed asbestos sheet such as the type used for thermal insulation. Asbestos sheets are relatively resistant to compression so as to permit secure clamping engagement with the main line pipe yet have sufficient compressibility to permit ready installation and to provide the coupling with limited flexibility and to conform to the curvature of the surface of the main line pipe.

While in the embodiment of Fig. 1 the insulating sheets are adhesively secured to the saddle portions, we may secure the sheets to the saddle in any convenient manner. Thus, referring to Fig. 6, the sheet 88 may be secured to the clamping member 65 by means of plastic rivets 90 extending through suitable apertures in member 65. In the embodiment shown in Fig. 7, the sheet 88 is secured by means of rubber pull plugs 92 also extending through apertures in member 65. The sheets 85 may be similarly secured to body portion 10. In the embodiment of Figs. 4 and 5, the insulating sheet 95 is molded to conform to the thickness of clamping member 65 and is slipped over this member before installation.

In the embodiments above-described, electrical currents are effectively prevented from passing from the main line pipe 14 and the branch line pipe 35 is thus insulated from the main line pipe. In some cases, however, it is also advantageous to insulate the branch line pipe 35 from the saddle portion with which it is engaged, in order, for example, to prevent electrolytic action between the branch line pipe and the saddle. Referring to Fig. 3, the desired insulation is conveniently obtained by provision of a suitably constructed insulating sleeve on the end of the branch line pipe. The insulating sleeve is conveniently made integral with the gasket 40. Thus, as shown in Fig. 3, the gasket comprises a main body portion 100, an outwardly-extending sleeve portion or apron 102 and an inwardly-extending sleeve portion or apron 104 having an inwardly-turned integral flange portion 105 at its free end. It will be observed that the sleeve portion 104 extends from the body portion 100 of the gasket to the end of the pipe and the flange 105 insures against accidental contact between the end of branch line pipe 35 and the wall of the T branch 20 of the saddle. Similarly, the apron 102 extends from the body portion 100 of the gasket outwardly beyond follower nut 42. Metal-to-metal contact is thus effectively prevented and current cannot pass between the saddle and the branch line pipe 35. The rubber or rubber composition from which the gasket and the sleeve portions are formed is, of course, electrically non-conducting. As mentioned, we preferably form the gasket and sleeves as an integral unit, but the sleeve 102 or the sleeve 104, or both, may be formed separately and pressed into sealing engagement with the branch 20 and the pipe 35 when the branch connection is made. As shown in Fig. 3, the pipe aperture in follower nut 42 must be sufficiently large to accommodate both the pipe 35 and the sleeve 102 of the gasket. The pipe aperture in the branch 20 must similarly, of course, also be of sufficient diameter to receive both the pipe 35 and the sleeve 104.

To apply our insulating saddle it is merely necessary to place the gasket sheet 60 and the body portion 10 in position on the main line pipe, to engage the stirrup member 77 with the projection 72 and then to pass the bolts 80 through the apertures in flanges 70 and 75 and tighten the bolts until a firm fit is obtained. The branch line pipe 35 is then inserted in the branch 20 of the body portion of the saddle and the follower nut 42 tightened to compress the gasket 40 into sealing engagement with the surface of pipe 35. An aperture 110 is then drilled in main line pipe 14 to provide a fluid flow path between the pipe and the interior of body portion 10. The drilling tool is conveniently inserted through the run 18 which is then plugged or capped after the drilling tool has been removed. Drilling of the pipe 14 will, of course, simultaneously provide a suitable aperture in gasket sheet 60. While it is generally preferable to form the aperture in main line pipe 14 after the saddle has been assembled, as above described, when the pipe is not in service the necessary aperture may be drilled before installation of the saddle, a suitable aperture also being formed in gasket sheet 60.

The above-described embodiments of our insulating saddle are generally suitable for installation on a main line which is out of service or which carries relatively low pressure fluids. As previously mentioned, however, lines carrying high pressure fluids present a special problem. This problem is effectively solved by a modified form of our saddle. Thus, referring to Figs. 8 and 9, there is shown a saddle similar to that shown in Figs. 1 and 2 except that the upper run of the T section of the body portion of the saddle is provided with a hinged check valve adapted to prevent outward flow from the T. As shown in Fig. 8, the upper run 118 of the T is formed with an annular recess 120 extending inwardly from its outer end in which is seated a valve body 122 having a flange 124 which is received in the recess 120 and having an apertured main portion 126. Hingedly connected to the body 122 is a plate 128 adapted to close the lower end of the aperture 130. The plate 128 is normally urged into closed position by a spring hinge 131 secured to the flange 124. The outer surface of the run 118 is threaded and a cap 135 is provided for threaded engagement with the run 118 to close it.

The embodiment of Figs. 8 and 9 is installed substantially in the manner above-described in connection with the embodiments of Figs. 1 to 7 up to the point of drilling the aperture in the main line pipe 14. Before the aperture is drilled, the connection with the branch line is completed so that it is ready to receive the fluid from the main line pipe. The drilling tool is then inserted through the run 118, the plate 128 being pressed open. The aperture is then drilled. As soon as the drilling is completed the drill is quickly removed and the plate 128 snaps shut to prevent escape of fluid through the run 118. Any substantial loss of fluid is thus prevented and the connection with the high pressure line is effectively made. The cap 135 is then screwed into place and the assembly is complete.

It will be apparent that our spring-pressed check valve construction is susceptible of modification, the check valve shown in Figs. 8 and 9 being merely one illustrative embodiment of this aspect of our invention. A modified form of check valve, for example, is that shown in Fig. 9a and Fig. 9b. In this embodiment the valve body is threaded into the run of the T. Thus, the upper end of run 218 is formed with an internally threaded portion 219 with which the exteriorly threaded valve body 222 is engaged. Valve body 222 is formed with a central bore 230 and has an annular flange portion 224 disposed in spaced relationship between the bore 230 and the inner wall of run 218. The bore 230 is closed by a valve plate 228. The valve plate 228 is pivoted on a hinge 231 mounted in a radially apertured portion of flange 224, the valve plate 228 having an extension 229 which is received in the radial aperture formed in flange 224. The valve plate 228 is continuously urged into closed position, i. e. against the surface of valve body 222 surrounding the lower end of bore 230, by a spring 233 which is coiled around the hinge 231 on each side of the extension 229. Spring 233 has a U-shaped connecting portion 234 which is received in two parallel sloping recesses formed in valve plate 228 and has leg portions 236 which bear against the inner wall of run 218. The operation of the valve shown in Fig. 9a is substantially the same as that of the valve shown in Figs. 8 and 9. After the aperture in the main line pipe 14 has been bored, the drill withdrawn and the valve plate 228 has automatically snapped shut to prevent escape of fluid, a cap 235 serves to close off the end of run 218.

In the embodiments illustrated in Figs. 8, 9, 9a and 9b, we have shown the run of our T saddle as having substantially the same diameter as the branch. It will be obvious that our invention is not limited to this relationship and the run may, for example, be of considerably lesser diameter than the branch. Similarly, in the embodiment of Figs. 9a and 9b, the valve body 222 may be press-fitted into the end of run 218 instead of being threadedly engaged therewith as shown. The important feature of our spring-pressed check valve construction is that it is continuously urged into closed position and yet is readily opened by inwardly-directed pressure so that a drilling tool may be inserted through the valve without difficulty but the valve will close immediately upon withdrawal of the tool. The embodiments of Figs. 8, 9, 9a and 9b thus enable branch connections to high pressure lines to be made with ease.

It will be observed that in the installed saddle metal-to-metal contact between the main line pipe 14 and all portions of the saddle is prevented by the gasket sheet 60 and by the insulating sheets 85 and 88. The opportunity for any galvanic action is thus eliminated and any current which may be flowing along the pipe 14 is prevented from passing to the saddle. It will also be observed that the gasket sheet 60 not only serves as a fluid-tight sealing medium which prevents escape of any of the gas or liquid flowing from the pipe 14 through the saddle into the branch line 35 but is also effective as an insulating means. When the saddle is applied, the sheet 60 is pressed into sealing engagement between the surface of the pipe 14 and the face 12 of the saddle body 10. Being formed from a resilient, elastic material, the sheet 60 is conformed to the surfaces between which it is compressed, whether maximum or minimum pipe is employed, and a fluid-tight electrically-insulating seal is effected. In the case of the branch line, tightening of the follower nut 42 compresses the gasket 40 and forms a fluid-tight seal between the branch 20 and the branch line 35, whether the latter be tubing or threaded or unthreaded pipe. In the embodiment of Fig. 3, the aprons or sleeves 102 and 104 prevent electrically conductive contact between the branch 20 and the branch pipe 35 and thus effectively insulate the saddle from the branch line. The saddle thus has wide general utility and makes unnecessary the stocking of a series of special saddles for different connections. As above described, the embodiments of Figs. 8 and 9 and 9a and 9b are of particular utility in making branch connections to a high pressure line while in service. The connection may be made rapidly with little or no loss of fluid from the system.

While we have fully described and illustrated our invention with reference to the several embodiments thereof shown in the drawings, it will be obvious to those skilled in the art that various changes and modifications may be made in the structural embodiment of the invention without departing from the scope thereof as defined in the appended claims, and it is intended therefore, that all matter contained in the foregoing description and in the drawings shall be interpreted as illustrative and not in a limiting sense.

What we claim and desire to secure by Letters Patent is:

1. A unitary insulating T pipe saddle ready for installation upon a main line pipe to provide an electrically non-conductive connection between the main line pipe and a branch line pipe comprising, in combination, a body portion having an inner face adapted to overlie a portion of the surface of said main line pipe, said face having a curvature substantially corresponding to the curvature of the main line pipe but of greater radius and having a central aperture for communication with a corresponding aperture formed in the main line pipe, said face being formed with a first surface portion surrounding said aperture receiving an insulating gasket for sealing the aperture in the pipe and the aperture in the face in fluid-tight relationship, and said face being formed with second surface portions on both sides of said first surface portion, strips of insulating material relatively resistant to compression disposed on said second surface portions and secured therein, said relatively-resistant strips being separate and spaced from said gasket and the portions of said strips adjacent said gasket being positioned to be spaced radially from the pipe when the saddle is applied thereto, whereby to define an expansion chamber surrounding said gasket to accommodate the flow of gasket material upon application of compressing force thereto, clamping means having portions engageable with said body portion for drawing the body portion toward the pipe to bring said gasket into fluid-tight engagement with the main line pipe and to apply said compressing force thereto, said clamping means including an arcuate central portion with an inner face having a curvature concentric with the curvature of the main line pipe but of greater radius, insulating means disposed on and substantially covering said inner face of said clamping means for preventing electrically conductive contact between said clamping means and said main line pipe, and means securing said insulating means to the central portion of said clamping means, said body portion and said central portion defining a cylindrical channel concentric with but spaced from the periphery of the main line pipe with which the saddle is to be used, and said gasket, said insulating strips and said insulating means being disposed in the annular space thereby defined.

2. A unitary insulating T pipe saddle ready for installation upon a main line pipe to provide an electrically non-conductive connection between the main line pipe and a branch line pipe comprising, in combination, a body portion having an inner face adapted to overlie a portion of the surface of said main line pipe, said face having a curvature substantially corresponding to the curvature of the main line pipe but of greater radius and having a central aperture for communication with a corresponding aperture formed in the main line pipe, said face being formed with a first surface portion surrounding said aperture receiving an insulating gasket for sealing the aperture in the pipe and the aperture in the face in fluid-tight relationship, and said face being formed with second surface portions on both sides of said first surface portion, strips of insulating material relatively resistant to compression disposed on said second surface portions and secured therein, said relatively-resistant strips being separate and spaced from said gasket and the portions of said strips adjacent said gasket being positioned to be spaced radially from the pipe when the saddle is applied thereto, whereby to define an expansion chamber surrounding said gasket to accommodate the flow of gasket material upon application of compressing force thereto, clamping means having portions engageable with said body portion for drawing the body portion toward the pipe to bring said gasket into fluid-tight engagement with the main line pipe and to apply said compressing force thereto, said clamping means including an arcuate central portion with an inner face having a curvature concentric with the curvature of the main line pipe but of greater radius, insulating means disposed on and substantially covering said inner face of said clamping means for preventing electrically conductive contact between said clamping means and said main line pipe, and means securing said insulating means to the central portion of said clamping means, said body portion and said central portion defining a cylindrical channel concentric with but spaced from the periphery of the main line pipe with which the saddle is to be used, and said gasket, said insulating strips and said insulating means being disposed in the annular space thereby defined, said central portion of said clamping means being provided with apertures, and electrically-insulating means connected with said insulating means and extending through said apertures for securing said insulating means to the central portion of said clamping means.

3. A unitary insulating T pipe saddle ready for installation upon a main line pipe to provide an electrically non-conductive connection between the main line pipe and a branch line pipe comprising, in combination, a body portion having an inner face adapted to overlie a portion of the surface of said main line pipe, said face having a curvature substanially corresponding to the curvature of the main line pipe but of greater radius and having a central aperture for communication with a corresponding aperture formed in the main line pipe, said face being formed with a first surface portion surrounding said aperture receiving an insulating gasket for sealing the aperture in the pipe and the aperture in the face in fluid-tight relationship, and said face being formed with second surface portions on both sides of said first surface portion, strips of insulating material relatively resistant to compression disposed on said second surface portions and secured therein, said relatively-resistant strips being separate and spaced from said gasket and the portions of said strips adjacent said gasket being positioned to be spaced radially from the pipe when the saddle is applied thereto, whereby to define an expansion chamber surrounding said gasket to accommodate the flow of gasket material upon application of compressing force thereto, clamping means having portions engageable with said body portion for drawing the body portion toward the pipe to bring said gasket into fluid-tight engagement with the main line pipe and to apply said compressing force thereto, said clamping means including an arcuate central portion with an inner face having a curvature concentric with the curvature of the main line pipe but of greater radius, insulating means disposed on and substantially covering said inner face of said clamping means for preventing electrically conductive contact between said clamping means and said main line pipe, and means securing said insulating means to the central portion of said clamping means, said body portion and said central portion defining a cylindrical channel concentric with but spaced from the periphery of the main line pipe with which the saddle is to be used, and said gasket, said insulating strips and said insulating means being disposed in the annular space thereby defined, said means securing said insulating means to the central portion of said clamping means comprising arms integral with said insulating means overlying the end edges of said central portion.

4. A unitary insulating T pipe saddle ready for installation upon a main line pipe to provide an electrically non-conductive connection between the main line pipe and a branch line pipe comprising, in combination, a body portion having an inner face adapted to overlie a portion of the surface of said main line pipe, said face having a curvature substantially corresponding to the curvature of the main line pipe but of greater radius and having a central aperture for communication with a corresponding aperture formed in the main line pipe, said face being formed with a first surface portion surrounding said aperture receiving a rubbery insulating gasket for sealing the aperture in the pipe and the aperture in the face in fluid-tight relationship, and said face being formed with second surface portions on both sides of said first surface portion, strips of asbestos disposed on said second surface portions and secured therein, said asbestos strips being separate and spaced from said rubbery gasket and the portions of said strips adjacent said rubbery gasket being positioned to be spaced radially from the pipe when the saddle is applied thereto, whereby to define an expansion chamber surrounding said gasket to accommodate the flow of gasket material upon application of compressing force thereto, clamping means having portions engageable with said body portion for drawing the body portion toward the pipe to bring said rubbery gasket into fluid-tight engagement with the main line pipe and to apply said compressing force thereto, said clamping means including an arcuate central portion with an inner face having a curvature concentric with the curvature of the main line pipe but of greater radius, and insulating means disposed on and substantially covering said inner face of said clamping means for preventing electrically conductive contact between said clamping means and said main line pipe, and means securing said insulating means to